A. McWHORTER.
FERTILIZER DISTRIBUTER.
APPLICATION FILED MAY 1, 1914.
1,134,688.
Patented Apr. 6, 1915.
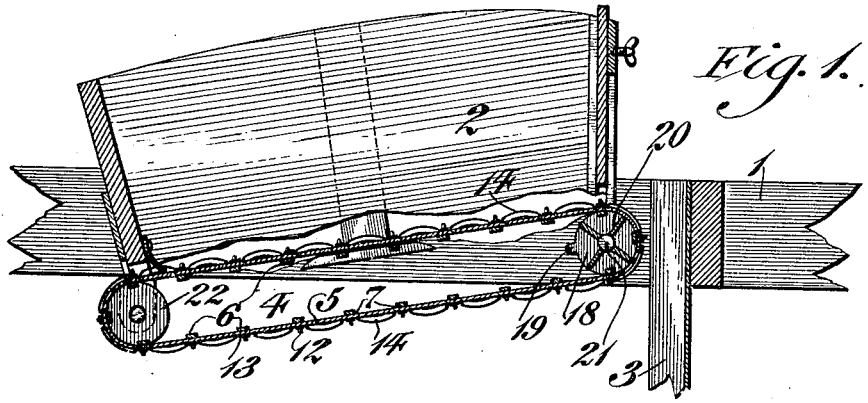
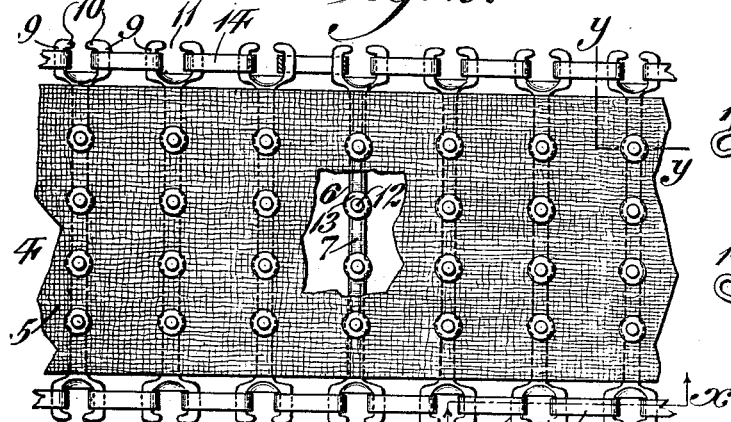
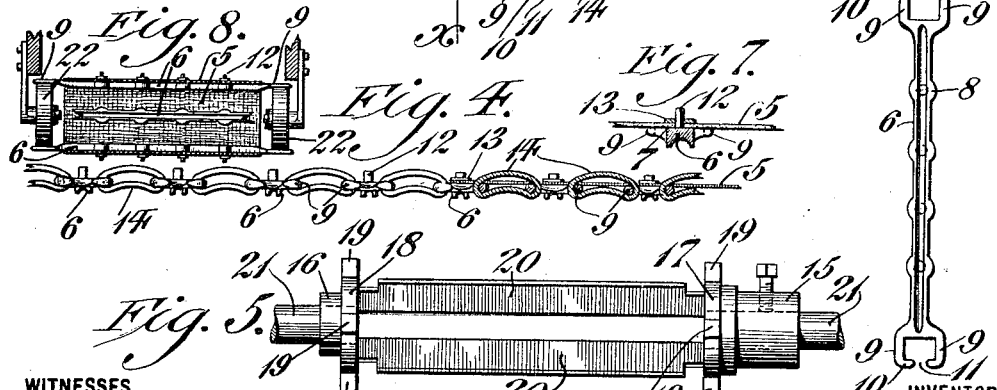

UNITED STATES PATENT OFFICE.

ALLEN McWHORTER, OF RIVERTON, NEW JERSEY, ASSIGNOR TO McWHORTER MANUFACTURING COMPANY, OF RIVERTON, NEW JERSEY, A CORPORATION OF NEW JERSEY.

FERTILIZER-DISTRIBUTER.

1,134,688.  Specification of Letters Patent.  Patented Apr. 6, 1915.

Application filed May 1, 1914. Serial No. 835,752.

*To all whom it may concern:*

Be it known that I, ALLEN McWHORTER, a citizen of the United States, residing at Riverton, in the county of Burlington, State of New Jersey, have invented a new and useful Fertilizer-Distributer, of which the following is a specification.

My invention relates to a new and useful improvement in fertilizer distributer, and consists of a novel belt for discharging the fertilizer from the hopper.

It further consists of novel means for supporting the belt in its travel.

It further consists of other novel features of construction, all as will be hereinafter fully set forth.

For the purpose of illustrating my invention, I have shown in the accompanying drawing, one form thereof which is at present preferred by me, since the same will give in practice satisfactory and reliable results, although it is to be understood that various instrumentalities of which my invention consists can be variously arranged and organized and that my invention is not limited to the precise arrangement and organization of these instrumentalities as herein shown and described.

Figure 1 represents a sectional view of a portion of a fertilizer distributer, embodying my invention. Fig. 2 represents a plan view of a portion of the belt employed, on an enlarged scale, showing a portion of the band broken away. Fig. 3 represents a sectional view, on an enlarged scale, showing a portion of the belt, and novel supporting means. Fig. 4 represents a partial elevation and partial sectional view, on line $x$—$x$ Fig. 2, of a portion of the belt. Fig. 5 represents an elevation of the supporting means employed. Fig. 6 represents a plan view of one of the cross bars employed. Fig. 7 represents a sectional view, on an enlarged scale, on line $y$—$y$ Fig. 2. Fig. 8 represents a partial elevation, partial sectional view of the rear end of the hopper, belt and supporting means.

Similar numerals of reference indicate corresponding parts in the figures.

Referring to the drawings:—1 designates a portion of the frame of the distributer, 2 designates a hopper suitably supported thereby, and 3 a discharge chute for the fertilizer, it being understood that the necessary parts are employed for accomplishing the desired results, although only a portion of the frame of the distributer and supporting means therefor are shown.

4 designates an endless belt, which forms the bottom of the hopper and is suitably positioned with respect to the said hopper, in order to support the fertilizer therein, and to feed the same therefrom to the discharge chute 3, which conducts the same to the ground. As shown, the belt consists of a band 5 of canvas, ducking, or other suitable material, to the inner side of which are secured a series of transversely or laterally extending bars 6, which are suitably spaced apart, and are provided with a flat upper face 7, against which the band 5 rests and is firmly held with respect thereto, and at intervals, the said bars are provided with the enlargements or laterally projecting portions 8. From each end of the bars project the spaced arms 9, which are provided with the inwardly extending lugs 10, between the ends of which is formed a space 11. The bars are secured in any suitable or desired manner to the band, and in the present instance, the said bars are provided with the extending pins or spurs 12, which are adapted to extend through openings in the band 5, and receive the washers 13, which firmly engage with the outer face of the band, in order to securely hold the same tightly against the flat upper face of the said bars 6. It will be noted that the pins or lugs 12 extend from the bars 6 at the points where the extensions or enlargements 8 are situated, in order that the main portion of the bar may be made relatively narrow, while the projections form the strengthening means where the greatest strain occurs, and also serve as suitable abutments for the washers 13 for securely gripping the band therebetween.

14 designates connecting means in engagement with adjacent arms 9 of the adjacent bars 6, said connecting means being here shown as curved links, and in movable engagement with the respective arms. By means of the flat faces 7 of the bars being held in close engagement with the band 5, and by reason of the relatively narrow width of the bars 6, the said band 5 will always be held tightly in engagement with the said faces 7 in the passage of the belt around the supporting means, and will thus prevent any fertilizer from passing between the said band 5 and the face 7 on the bar. This is a considerable improvement over the fertilizers of which I am aware, which employ an endless belt, and in which the faces of the cross bars are curved, leaving a space between the same and the band, this space serving as a pocket or receptacle into which the fertilizer enters, and is held, and by reason of which and the continued use of the belt in passing around the sprocket, it not only tends to form flat places in the band, but also tends to stretch the same unduly, thus impairing the proper operation of the band. In my belt, this is impossible for the reasons already described. In addition, the connecting means or links 14 serve to prevent stretching of the band 5, and at the same time, by reason of the movable engagement of the said links with the arms, it is impossible for the fertilizer to settle between these parts, as there will always be movement between the parts.

By reason of forming the bars 6 of relatively narrow portions, I have found it necessary to additionally support the band 5 in its passage around the supporting means, and in the present instance, I have shown in the forward end of the distributer, a supporting means for accomplishing this result, which consists of the two hubs 15 and 16, having suitable sprocket wheels 17 and 18, provided with the spaced teeth 19. Extending between the sprocket wheels 17 and 18 are the supporting members 20, here shown as plates, which extend at a point intermediate the teeth 19, of the respective sprocket wheels, as will be clearly understood from Fig. 3, it being noted particularly from Fig. 5 that the said plates are spaced from each other, in order to prevent a formation of any pocket or means for receiving and holding the fertilizer, and it will be noted from Figs. 1 and 3 that, as the belt passes around the supporting means, the outer edges of the supporting plates 20 contact with the inner side of the band 5 and support the same in suitably rounded condition, preventing any inequalities being formed in the belt and causing the proper operation of the parts.

The supporting means is mounted in any suitable manner on the frame 1, and as here shown, I have provided the hub shaft 21 for this purpose. At the rear end of the hopper, I provide two separate hubs or idlers 22, around which the belt passes, and which are spaced apart laterally, in order to prevent the formation of any pocket for receiving and holding the fertilizer, in order that there will be no stretching or improper action on the part of the belt in its operation.

By forming the lugs 10 of the bars spaced apart, it will be understood that the parts may be quickly and easily assembled or replaced, if necessary, by sliding one of the links through the space between the lugs, after releasing the tension on the belt proper.

It will be understood that by reason of the loose movable connection between the connecting means or links 14 and the arms 9, the fertilizer cannot lodge between the same and clog up, and by reason of this, there is less possibility of rusting of the parts, which is the case when there is a close fit between the parts, if a chain were employed without a loose movable connection. It will be understood that the links and lugs may be made in suitable form to accomplish the desired results.

It will now be apparent that I have devised a novel and useful fertilizer distributer, which embodies the features of advantage enumerated as desirable in the statement of the invention and the above description, and while I have, in the present instance, shown and described a preferred embodiment thereof which will give in practice satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In a fertilizer distributer, a feed belt, comprising a band, bars extending across said band at intervals and having flat faces against which said band is seated, means for securing said bars and band together, engaging means carried at each end of said bars, and a connecting link extending between adjacent bars with one of the engaging means of the adjacent bars movably embraced by and normally seated in the ends of the link, whereby free rotary movement at the engagement is insured.

2. In a fertilizer distributer, a feed belt, comprising a band, bars suitably connected therewith, spaced apart and having laterally projecting portions and flat engaging faces against which the belt is held, a series of spurs projecting from the flat faces and extending through said band, and means engaging the extending portions of the spurs at the enlargements of the bars for securing the bars and band together.

3. In a fertilizer distributer, the combination with a feed belt, comprising a band, bars extending across said band at intervals, and against which said band is seated, means for securing said bars and band together, of sprocket wheels, suitably supported, and having teeth at intervals, and supporting members secured to and extending between said wheels at points intermediate said teeth, and adapted to engage with and support the belt, intermediate the bars of the belt, when said belt is passing around the sprocket wheels.

4. In a fertilizer distributer, the combination with a feed belt, comprising a band, bars extending across said belt at intervals, against which said band is seated, means for securing said bars and belt together, of sprocket wheels, suitably supported, and having teeth at intervals, and supporting members spaced from each other secured to and extending between said wheels at points intermediate said teeth and adapted to engage with and support the belt intermediate the bars of the belt when said belt is passing around the sprocket wheels.

5. In a fertilizer distributer, the combination with a feed belt, comprising a band, bars extending across said belt at intervals, means for securing said bars and said belt together, engaging means carried at each end of said bars, of sprocket wheels, suitably supported and having teeth at intervals adapted to engage with said bars, and supporting members extending between said wheels at points intermediate said teeth and adapted to engage with and support the belt intermediate the bars when said belt is passing around the sprocket wheels.

6. In a fertilizer distributer, a feed belt comprising a band, bars extending across said band at intervals and suitably secured thereto, engaging means carried at each end of said bars, and a connecting link extending between adjacent bars with one of the engaging means of the adjacent bars movably embraced by and normally seated in the ends of the link, whereby free rotary movement at the engagement is insured.

ALLEN McWHORTER.

Witnesses:
C. D. McVay,
M. E. Byrne.